C. W. CLIFFORD.
PLANT RECEPTACLE.
APPLICATION FILED JAN. 25, 1917.

1,226,311.

Patented May 15, 1917.

INVENTOR
Charles W. Clifford
BY
ATTORNEY

UNITED STATES PATENT OFFICE.

CHARLES W. CLIFFORD, OF TRENTON, NEW JERSEY.

PLANT-RECEPTACLE.

1,226,311.

Specification of Letters Patent. Patented May 15, 1917.

Application filed January 25, 1917. Serial No. 144,321.

*To all whom it may concern:*

Be it known that I, CHARLES W. CLIFFORD, a citizen of the United States, residing at Trenton, in the county of Mercer, in the State of New Jersey, have invented certain new and useful Improvements in Plant-Receptacles, of which the following is a specification.

The objects of my invention are to produce an earthen receptacle which, while of sufficient strength and firmness to retain its integrity prior to being put in use, will, while in use, gradually disintegrate and nourish the plant contained therein by fertilizing component elements of its substance, such receptacles being also of a form adapted not only to disintegrate progressively in a manner most advantageous to the plant contained therein, but to prevent or minimize fracture and economize space during handling or transportation.

Figure 1:
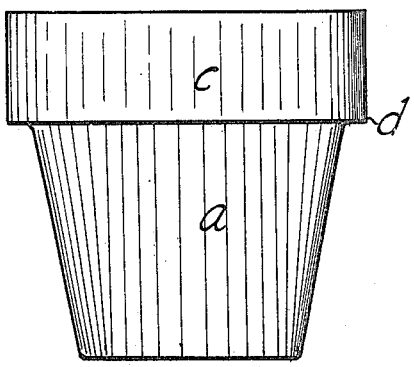
Figure 3:
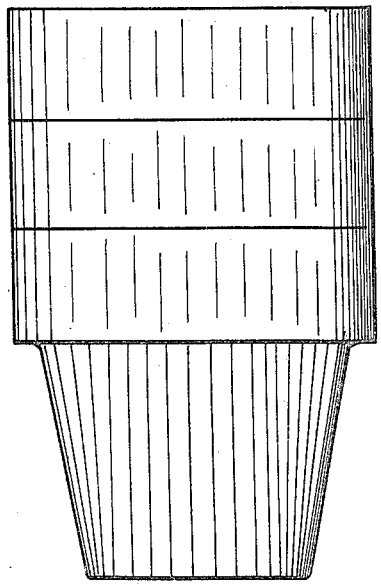
Figure 2:
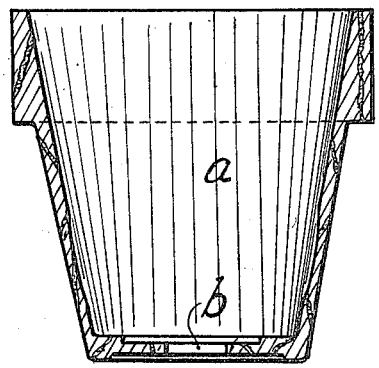
Figure 4:
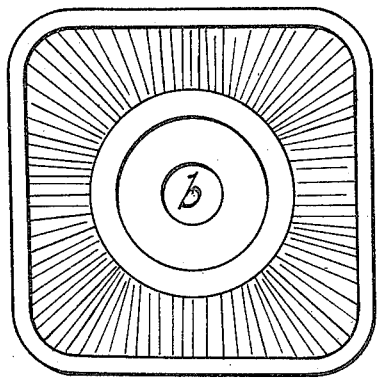

In the accompanying drawings, forming a part of this specification, Figure 1 is a side elevation of my preferred form of plant receptacle; Fig. 2 is a vertical mid-sectional view thereof; Fig. 3 is a side elevation of three of my receptacles shown in "nested" position, and Fig. 4 is a top view of one of said receptacles.

My receptacle, preferably made in the form shown in the drawings, is made of clay, and reinforced with fibers, preferably vegetable fibers, such as straw, jute, or other fiber subject to timely decay when exposed to moist earth, to which may be added any soluble binder substance not obnoxious to plant life; and in preparing the materials to be formed into receptacles, I prefer to mix with the clay, in suitable proportions, fertilizing materials best adapted to the nourishment of the species of plants intended to be placed therein.

The lower part, $a$, of the receptacles is of the usual form of such structures, that is circular in cross-section, and is provided with a central opening, $b$, in the bottom thereof to permit of the escape of excess of moisture, and the wall of said body portion is comparatively thin with its middle portion or zone and its bottom of the least thickness, as indicated in Fig. 2 of the drawings. The upper part, $c$, of the receptacle is considerably augmented in thickness, and is made square in cross-section with rounded corners, while the lower edge of said augmented portion is so formed as to produce a shoulder, $d$, continuous along all parts of the periphery of the upper end of the circular portion, $a$, of the receptacle.

The receptacle is preferably formed by means of dies under a pressure sufficient to give the vessel the necessary solidity to enable it to withstand the usual handling and transportation. When thus formed the receptacles are kiln or sun-dried, but not fired or baked so as to harden them excessively, carbonize the vegetable fibers contained in the clay, or cause deterioration of any fertilizing materials contained therein.

When thus formed and finished the receptacles possess sufficient strength to withstand the ordinary strains incident to their necessary manipulation, and, owing to their form, they may be "nested" for storage and transportation in the most advantageous manner both as concerns space and breakage.

When put to use, the receptacles are filled with earth, and the seeds, plants, shoots, &c., are bedded therein in the usual manner, and the fertilizing material contained in the bodies of the vessels accelerates the nourishment and growth of the plants, the roots whereof force themselves into the bodies of the receptacles. When the plants are to be transplanted, instead of removing them from the receptacles, thereby breaking and injuring the roots, they are buried in the ground with the receptacles adhering to and protecting the roots, and the plant-food contained in the bodies of the receptacles contributes to the more rapid growth of the plants whose roots grow through said bodies into the surrounding soil, naturally first passing through the thinnest parts of the sides and bottoms of the receptacles, and gradually breaking up the bodies so that they become a part of the soil in which they are placed. By such means not only is all injury to the plants obviated, but the halt in their growth due to the injury and shock of transplantation, always experienced under ordinary conditions, is entirely avoided, and the accelerated growth of the plants continues as the bodies of the receptacles gradually disintegrate, and give up to the plants their nourishing content.

The sizes of my receptacles may, of course, be varied to fit them to receive seeds, young plants, shoots or small trees.

Having thus described my invention, I claim:

1. A plant receptacle formed of earthy material containing a plant fertilizing element, and strengthened by readily decomposable fibers distributed throughout its body.

2. A plant receptacle formed of earthy material containing a plant fertilizing element and a soluble binder, and strengthened by readily disintegrated vegetable fibers distributed throughout its body.

CHARLES W. CLIFFORD.

Witnesses:
JOHN R. D. BOWER,
NORMAN W. NUTT.

Copies of this patent may be obtained for five cents each, by addressing the "Commissioner of Patents, Washington, D. C."